United States Patent Office 2,926,151
Patented Feb. 23, 1960

2,926,151

EMULSION COPOLYMERIZATE OF HEAT BODIED GLYCERIDE OILS AND VINYLIC MONOMERS

Joseph G. Kingston, Cleveland, and Robert Frank Schwartz, Columbus, Ohio, assignors to The Glidden Company, Cleveland, Ohio, a corporation of Ohio No Drawing. Application August 26, 1953
Serial No. 376,762

11 Claims. (Cl. 260—23)

This invention relates to the manufacture of emulsions and to surface coatings produced therefrom.

The Robinson U.S. Patent No. 2,586,092 describes the preparation of copolymer emulsions from "bodied" oils such as "bodied" linseed and "bodied" dehydrated castor oils along with styrene and in most instances, rosin. The patent also describes the preparation of coating compositions from such emulsions. Whereas Robinson discloses the use of "bodied" oils having viscosities up to 130 poises, we have now discovered that by using oils having higher viscosities, i.e., above about 150 poises, critically different properties are secured in the resulting copolymers and in the coating compositions prepared from the resulting emulsions. For example, we have found that an emulsion prepared according to the above patent from styrene, rosin and a bodied linseed oil of 130 poises will exhibit substantitlly no hold-out when applied to a porous surface, the coating sinking or being drawn into the pores of the surface by capillary forces. In contrast, an emulsion prepared from the same ingredients in the same manner and proportions, except that the linseed oil has been bodied to a viscosity of at least 150 poises, will exhibit excellent hold-out when applied to the same porous surface. Good hold-out in a coating composition is of course a very desirable property since it means that porous surfaces can be given a true surface film by applying a single coat, whereas a coating exhibiting poor hold-out will not give a true surface film until substantially all of the pores have been filled up by means of repeated applications of the coating. Hence good hold-out induces a high covering power for the coating, whereas poor hold-out leads to low covering power. For a further description of the merits of good hold-out in emulsion coating compositions, see the copending application of Herzog and Gilchrist Ser. No. 322,359, filed November 24, 1952, now Patent No. 2,709,689.

Other critical differences resulting from the use of our highly bodied oils instead of the lower bodied oils of the Robinson patent are described hereinafter.

Accordingly, it is an object of this invention to provide improved emulsion coatings prepared from highly bodied oils having viscosities in excess of about 150 poises.

Another object is to provide a process for manufacturing the foregoing improved coatings.

These and other objects will be apparent from the following description of the invention.

As noted above, we have discovered that unexpected improvements in emulsion copolymer coatings can be effected by employing highly bodied oils in the preparation of the copolymers. The unexpected improvements begin to appear under optimum conditions when the viscosity of the highly bodied oil is about 150 poises. Under less favorable conditions, the viscosity should be even higher.

We have found that the improvements induced by the use of such highly bodied oils include good hold-out (already described above) and a change in the character of the copolymer from the fluid, tacky, pore-penetrating, relatively-slow-curing copolymer resulting from oils of low body as compared to a rubbery, tough, non-penetrating, fast-curing copolymer of highly bodied oils.

Our improvements can be secured by emulsion-polymerizing the highly bodied oils with a variety of reactive vinylic monomers including but not limited to styrene, vinyl toluene, myrcene, divinyl benzene and 2-vinyl pyridine. These and like monomers can constitute from about 5% to 80% of the total weight of materials making up the finished copolymer. We prefer between about 30%–40% of the monomers, especially with oils having viscosities between about 150 and 200 poises. Other materials which can be used along with the highly bodied oil(s) and the reactive monomer(s) are: rosin; e.g., gum rosin, wood rosin, stabilized rosin, hydrogenated rosin, polymerized rosin; any of the acids of such rosins; tall oil or tall oil acids; and fatty acids of 6–22 carbons, such as oleic, stearic, coconut oil fatty acids, etc. These materials can be used in minor amounts to vary the properties and characteristics of the copolymer and of coatings made from the copolymer emulsion(s).

The highly bodied oils which can be used include drying and semi-drying oils such as bodied linseed, soybean, dehydrated castor, fish oils, oiticica oil, tung oil and safflower oil. As noted previously, any of such or other oils employed in the copolymer should have been bodied to a viscosity of at least 150 poises and preferably to 200 poises or higher up to 900 poises or more, including oils which have been gelled. The heavy body can be secured in any of the numerous ways already known to those skilled in the art, as by simply heating the oil until it has attained the desired body, or by heating in the presence of one or more known bodying catalysts such as beta-methylanthraquinone. Since shorter heating time is possible where catalysts are used, we prefer catalytic bodying. However, so far as reactivity of the oil is concerned, as well as attainment of the improvements described herein, oils bodied simply by heating are the full equivalent of oils bodied in the presence of known bodying catalysts. In explanation, and without being bound thereby, our views are that the bodying treatment, however conducted, results in linear glyceride chains of large molecular weight, and that by forming these chains before copolymerizing them with monomer(s), the dominant properties of the future copolymer have been fixed and are modified only slightly by the extent of cross-linking occasioned thereafter by reaction of the chains with the monomer(s).

The emulsion copolymerization of the bodied oil(s) with monomer(s) can of course be conducted in a variety of ways and under a variety of conditions, such variations in procedure and/or conditions giving variations in properties of the resulting emulsion. The Robinson patent supra discloses some procedural variations which we employ, but the procedure which we presently believe to be most satisfactory consists in bodying the oil at 525°–590° F. with beta methylanthraquinone as catalyst to a viscosity of at least 150 poises, then melting rosin and styrene (or other monomer) into the bodied oil. An amine such as 2-amino-2-methyl-1-propanol is dissolved in water to form a dilute solution, and this solution is then added with agitation to the oil-rosin-styrene mass while the latter is hot to form an emulsion of the oil-in-water type. Additional water can then be added to bring the emulsion to a solids content of 20–65% by weight, preferably around 50%. A polymerization catalyst of known type is next added, and the resulting mass of emulsion is heated at 125°–200° F. with continuous, moderate agitation until the desired copolymerizate has been formed. Such treatment is usually continued for from 4 to 72 hours depending on the temperature, on the ingredients and their proportions in the reactive mass, and on the resinous nature of the product sought. Lower temperatures generally require longer times, and vice versa. Short times generally give more unconverted monomer than do longer times.

The following examples illustrate the treatment outline above.

*Example 1*

|  | Parts |
|---|---|
| Bodied linseed oil | 70.0 |
| Rosin | 5.6 |
| Styrene | 30.0 |
| 2-amino-2-methyl-1-propanol | 2.24 |
| Water | 107.0 |
| Cumene hydroperoxide as polymerization catalyst | 0.25 |
| Total parts by weight | 215.09 |

Bodied linseed oil was prepared by mixing it with 0.04% beta methylanthraquinone and by then heating the mixed mass at temperatures between about 575° F. and 585° F. for 10–14 hours. Such an oil has a viscosity of about 700–900 poises. The rosin and styrene were then melted into the hot oil. The whole mass was allowed to cool to about 200° F. The 2-amino-2-methyl-1-propanol was dissolved in 17 parts of water and was added gradually to the cooled mass of oil-rosin-styrene with vigorous agitation to form an emulsion. The balance of the water was then added after which the polymerization catalyst was added. The resulting emulsion was heated in a container of stainless steel (iron or glass can be used) at 185–195° F. for 6–8 hours. Heating was then discontinued, and the emulsion was allowed to cool.

A sample of the emulsion was poured onto porous paper board and was allowed to dry. The resulting film was set to touch with a characteristic tack in 10–20 minutes and adhered firmly to the board but showed no evidence of penetration into the porous box board such as would be revealed by a dark brown staining of the board.

The copolymer in a sample of the emulsion was coagulated; it was a white elastomeric mass.

*Example 2*

Linseed oil was heat bodied in the presence of .04% beta methylanthraquinone as in Example 1 except that the bodying treatment was continued until the viscosity had attained a value of about 900 poises. Twenty parts of this highly bodied oil was used in combination with 80 parts of styrene to replace the oil and styrene of Example 1, and was emulsion-polymerized in the manner described in Example 1. The resulting emulsion exhibited good hold-out when poured onto porous paper board and allowed to dry.

*Example 3*

When the 900 poise oil of Example 2 was emulsion polymerized by melting together 90 parts of the oil, 5.6 parts of rosin and 10 parts of styrene and then converting the melt into an emulsion wherein the melt was the dispersed phase, all in the manner described in Example 1, the resulting emulsion exhibited good holdout when poured on porous paper board and allowed to dry.

It will be understood that numerous variations and substitutions can be made in the procedure outlined and exemplified above for conducting the emulsion polymerization. Numerous amines and alkalies can be used in place of 2-amino-2-methyl-1-propanol, as for example, monoethanolamine, triethanolamine, ammonia, sodium hydroxide, potassium hydroxide, etc. Such alkalies react with the rosin and/or fatty acids to form anionic emulsifiers whose function is to bring about the emulsification of the oil(s)-rosin and/or fatty acid-monomer(s) mass in the water. While a host of anionic and/or non-ionic emulsifying agents can be used for this general function, they should also be chosen with a view toward their suitability or unsuitability in the coating composition(s) which will be prepared from the copolymer emulsion. A discussion of this phase of the art is given in the Herzog and Gilchrist application identified above, particularly in respect to the part different kinds and amounts of emulsifiers play in permitting a coating composition to be formulated so as to develop certain desired viscosity characteristics in the coating composition. Other aspects concerning the suitablility of various emulsifiers in protein-stabilized emulsion coatings for gloss finishes are described in the Schulte and Herzog U.S. Patent No. 2,587,657. Moreover, it is well known to those skilled in the art of emulsion polymerization that the chemical composition(s) and/or amounts of emulsifier are quite instrumental in varying the nature of the resinous properties obtained on copolymerizing particular kinds and/or proportions of starting materials.

Various aids to emulsification can be used such as ethylene glycol monoalkyl ethers (e.g., monobutyl or monoethyl ethers), butanol, ethylene glycol, diethylene glycol and/or ethanol. While the use of such an aid or aids is not essential, we have found that the presence of one or more of them in small amounts usually leads to emulsions of finer particle size than can be secured in their absence.

Various polymerization catalysts, both organic and inorganic, can be used in place of or along with the catalyst of Example 1, such as benzoyl peroxide, di-t-butyl hydroperoxide, cyclohexanone peroxide, hydrogen peroxide, etc. The amount of catalyst(s) used can vary from about 0.25% to about 2% based on the monomer(s).

As noted above our use of highly bodied oils in wide proportions to monomer permits us to vary the kind and amount of soap as well as polymerization time, thereby to provide copolymers of from low molecular weight to high molecular weight, in an emulsion state. The many possible variations are instrumental in providing clear, glossy films at one extreme to either clear or cloudy flat films at the other extreme. The drying and aging properties can be adjusted with or without driers. The copolymer emulsions can be used as vehicles for clear or pigmented water base emulsion coatings, or as plasticizers in emulsion systems containing other resinous materials. The coagulated copolymers can be used as resinous raw materials for incorporation into non-aqueous resinous masses or products.

Having described our invention, what we claim is:

1. As a novel composition of matter, an aqueous, alkaline emulsion of rubbery, film-forming copolymerizate prepared by emulsion-polymerizing a homogeneous organic mixture containing about 20 to 95 parts of heat-bodied glyceride oil selected from the group consisting of drying and semi-drying oils, said head-bodied oil having a viscosity of at least 200 poises at 25° C. and about 5 to 80 parts of at least one monomeric copolymerizable vinylic compound, said glyceride oil and said vinylic compound together amounting to about 100 parts by weight, said emulsion polymerization being carried out at temperatures between about 125° F. and 200° F. with an alkaline, aqueous medium as the continuous phase and with said homogeneous organic mixture as the dispersed phase for a period of about 4 to 72 hours in the presence of a peroxidic polymerization catalyst; said monomeric copolymerizable vinylic compound being selected from the group consisting of styrene, vinyl toluene, myrcene, divinyl benzene and 2-vinyl pyridine.

2. A composition of matter as claimed in claim 1 wherein the heat-bodied glyceride oil is heat-bodied linseed oil.

3. A composition of matter as claimed in claim 1 wherein the heat-bodied glyceride oil is heat-bodied soybean oil.

4. A composition of matter as claimed in claim 1 wherein the heat-bodied glyceride oil is heat-bodied dehydrated castor oil.

5. A composition of matter as claimed in claim 1 wherein said homogeneous organic mixture contains a small amount of carboxylic acid selected from the group consisting of rosin, fatty acids of 6–22 carbons, and mixtures thereof.

6. A composition as claimed in claim 5 wherein the copolymerizable vinylic compound amounts to 30–40 parts by weight in said homogeneous organic mixture.

7. A composition as claimed by claim 6 wherein the copolymerizable vinylic compound is styrene.

8. A composition as claimed in claim 7 wherein said homogeneous organic mixture is composed of about 70 parts of heat-bodied linseed oil having a viscosity of about 700–900 poises at 25° C., about 5.6 parts of rosin, and about 30 parts of styrene, and wherein the polymerization is carried out at temperatures between about 185° F. and 195° F. for a period of about 6 to 8 hours.

9. A composition as claimed in claim 7 wherein said homogeneous organic mixture is composed of about 20 parts of heat-bodied linseed oil having a viscosity of about 900 poises at 25° C., about 5.6 parts of rosin and about 80 parts of styrene, and wherein the polymerization is carried out at temperatures between about 185° F. and 195° F. for a period of about 6 to 8 hours.

10. A composition of matter as claimed in claim 7 wherein said homogeneous organic mixture is composed of about 90 parts of heat-bodied linseed oil having a viscosity of about 900 poises at 25° C., about 5.6 parts of rosin, and about 10 parts of styrene, and wherein the polymerization is carried out at temperatures between about 185° F. and 195° F. for a period of about 6 to 8 hours.

11. The method of directly preparing by emulsion polymerization an aqueous, alkaline coating of rubbery, film-forming copolymerizable emulsion which comprises: preparing a stable alkaline emulsion of the oil-in-water type having a solids content of 20–65% by weight and having as the dispersed phase a solution of (a) 20% to 95% by weight of a heat-bodied glyceride oil selected from the group consisting of drying and semi-drying oils, said bodied oil having a viscosity at 25° C. of at least 200 poises, (b) 5% to 80% by weight of at least one monomeric copolymerizable vinylic compound selected from the group consisting of styrene, vinyl toluene, myrcene, divinyl benzene and 2-vinyl pyridine, and about 5.6% of rosin acids based on the total of (a) plus (b); and heating said emulsion with .25–2% by weight of peroxidic polymerization catalyst at temperatures between about 125° F. and 200° F. for a period of about 4 to 72 hours.

References Cited in the file of this patent

UNITED STATES PATENTS 2,586,092 Robinson     Feb. 19, 1952

OTHER REFERENCES

Chatfield: Varnish Constituents, Leonard Hill Ltd., London, 1953, copy in Div. 50, pp. 66–67.

Chatfield (2): "Varnish Constituents," Leonard Hill Ltd., London, 3rd edition, 1953, page 21. (Copy in Div. 60.)